Jan. 10, 1928. 1,655,534
W. C. CARPENTER
FUEL BRIQUETTE FORMING AND DRYING MACHINE
Filed March 18, 1926 2 Sheets-Sheet 2
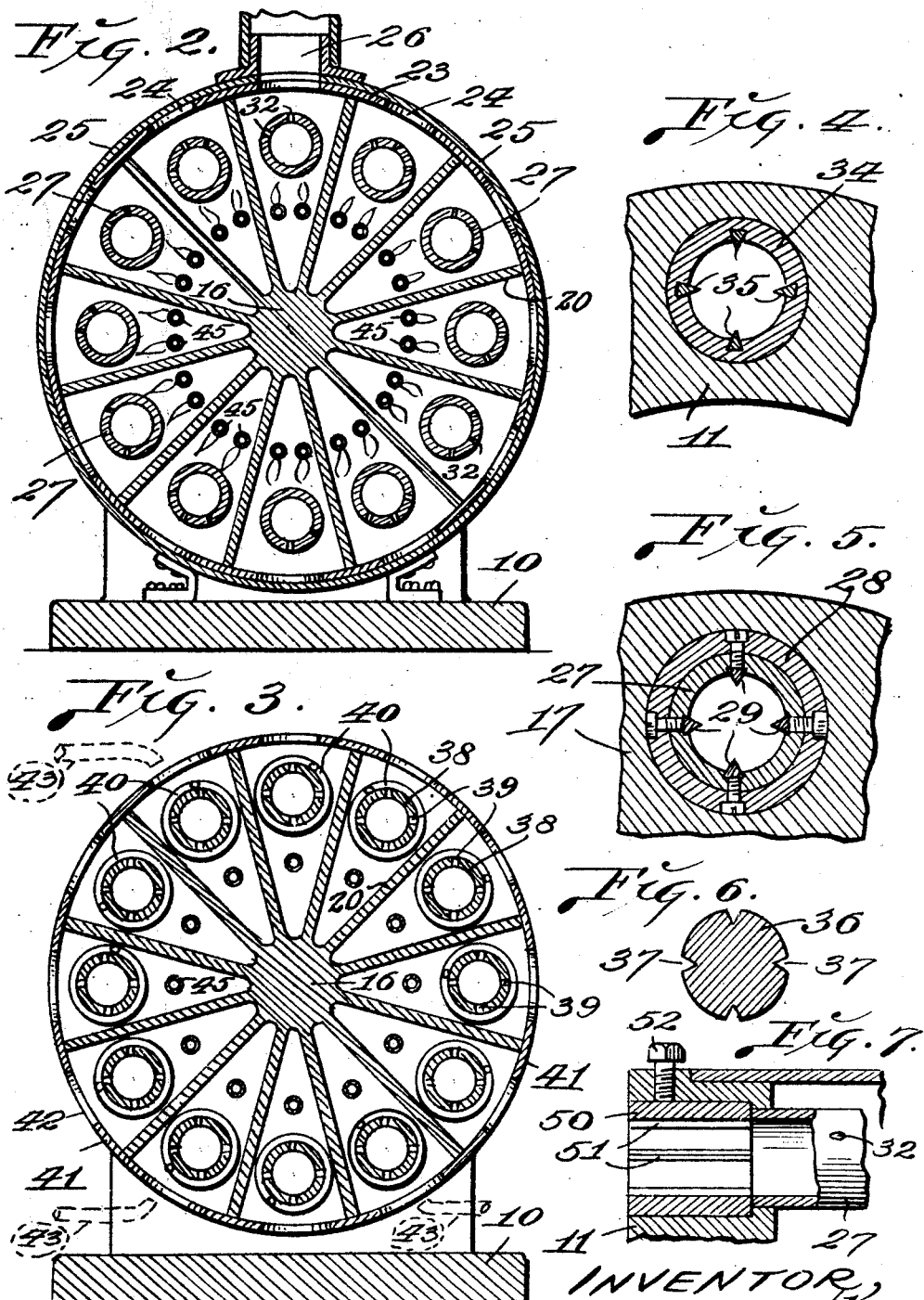
INVENTOR,
W. C. Carpenter.
By Martin P. Smith Atty.

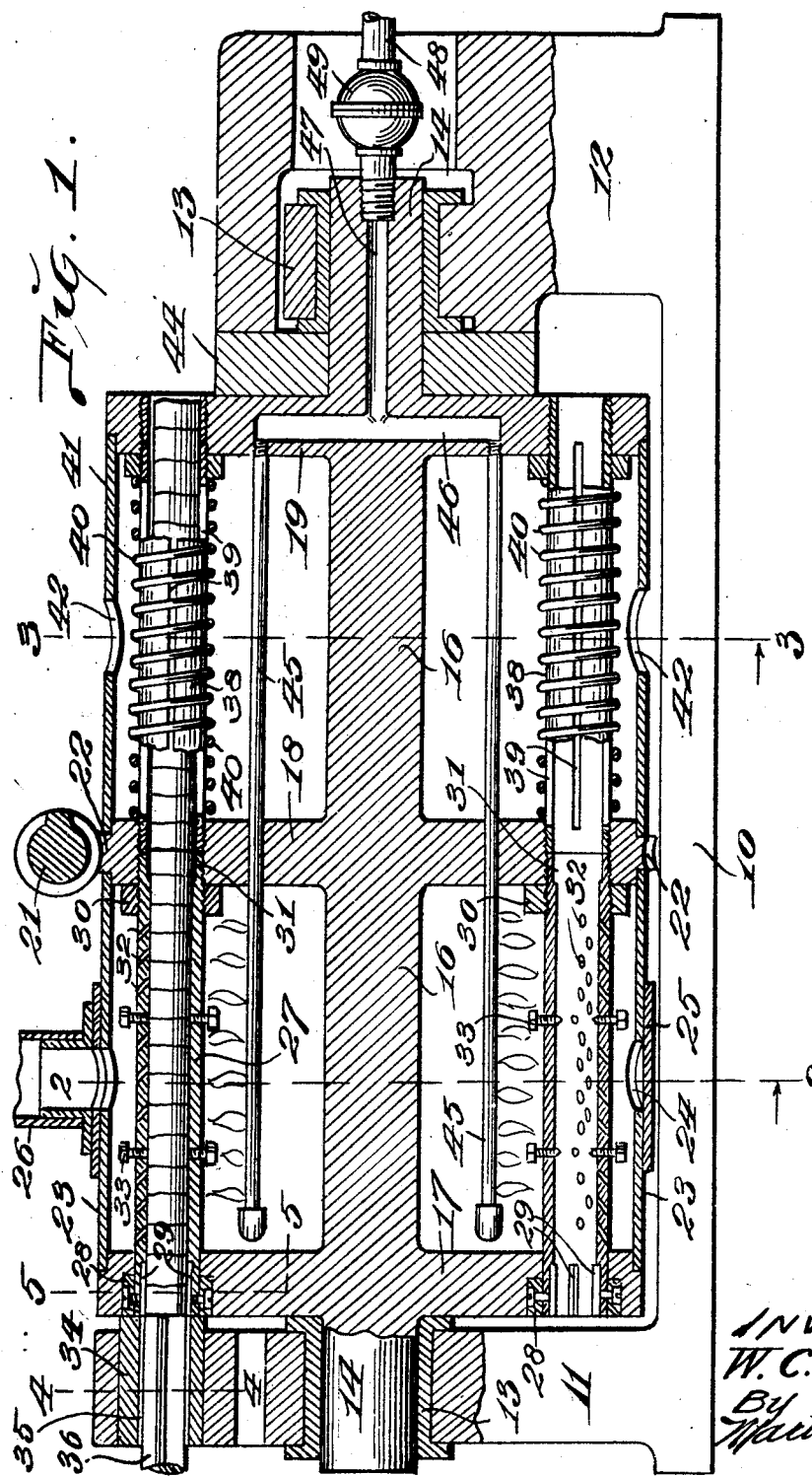

Patented Jan. 10, 1928.

1,655,534

UNITED STATES PATENT OFFICE.

WILLIAM C. CARPENTER, OF SAN FRANCISCO, CALIFORNIA.

FUEL-BRIQUETTE FORMING AND DRYING MACHINE.

Application filed March 18, 1926. Serial No. 95,622.

My invention relates to an apparatus for producing fuel briquettes from sawdust, wood shavings, and the like, and has for its principal objects the provision of a relatively simple and practical apparatus whereby briquettes may be produced from sawdust, wood shavings, and the like, and in which practice certain elements in the material from which the briquettes are formed provide the necessary binding element, thereby doing away with the requirement of an extraneous binder; further, to provide improved means of forming comminuted wood into relatively hard briquettes having uniform density throughout their bodies; and further, to provide means for baking the briquettes or subjecting the same to heat while they are in the molds or forms for the purpose of searing or charring the surfaces of the briquettes, thus providing a carbonaceous crust that serves as a protection for the greater portion of the material forming the bodies of the briquettes and enabling the briquettes to be readily handled in storage, transportation, and use, without fracture, breakage, and disintegration.

Further objects of my invention are to provide a relatively simple and practical apparatus that may be economically operated in the production of briquettes from sawdust, wood shavings, and the like, which apparatus includes a rotary head or member that carries a plurality of combined dies and baking chambers; further, to provide means whereby the briquttes, after being formed, may be conveniently baked or subjected to heat for any desired period of time, thus searing or charring the bodies of the briquettes to any desired depth; and further, to provide an apparatus that will within a given period of time produce a relatively large tonnage or out-put of briquettes, and which latter are ready for use immediately after being discharged from the forming and baking means.

A further object of my invention is to provide a fuel briquette forming apparatus with simple and effective means for rapidly cooling or reducing the temperature of the briquettes in order that the same may be handled readily with practically little if any breakage or disintegration immediately after the briquettes are discharged from the apparatus.

With the foregoing and other objects in view, my invention consists in certain novel features of construction and arrangement of parts that will hereinafter be more fully described and claimed and illustrated in the accompanying drawings, in which—

Fig. 1 is a vertical section taken lengthwise through the center of a briquette machine embodying the principles of my invention.

Fig. 2 is a cross section taken on the line 2—2 of Fig. 1.

Fig. 3 is a cross section taken on the line 3—3 of Fig. 1.

Fig. 4 is an enlarged cross section taken on the line 4—4 of Fig. 1.

Fig. 5 is an enlarged cross section taken on the line 5—5 of Fig. 1.

Fig. 6 is a cross section of the plunger that cooperates with the die in forming the briquettes.

Fig. 7 is a sectional view of a modified form of the briquette forming die.

Referring by numerals to the accompanying drawings which illustrate a practical embodiment of my invention, 10 designates a base provided adjacent to its ends with standards 11 and 12 and the upper portions of said standards being provided with bearings 13 for trunnions 14 that project from the ends of the rotary member that carries the combined forming and baking dies and the cooling dies or briquette holders. This rotary member comprises an axially disposed shaft 16 that is in line with the trunnions 14 and said shaft carrying a series of three disks 17, 18 and 19, and these disks being connected by radially arranged webs or plates 20.

The rotary member thus constructed may be driven in any suitable manner, for instance by means of worm wheel such as 21 that engages teeth 22 and which latter are formed on the periphery of one of the disks, preferably the center disk 18.

A shell 23 of suitable sheet metal encircles that portion of the rotary member between the disks 17 and 18 and formed in said shell is a circumferentially disposed row of apertures 24, there being one aperture for each chamber between the radially disposed webs 20. Secured in any suitable manner to the base 10 is a ring 25 that encircles shell 23 and overlies the row of apertures therein, and formed in the top of said ring is an outlet opening 26.

The combined forming and baking dies for the briquettes are formed of sections of metal tubing 27 that are arranged lengthwise of the rotary member with the ends of said tubing occupying suitably formed openings in the disks 17 and 18. The forward or material receiving ends of these tubular members have secured thereto in any suitable manner collars 28 that occupy corresponding recesses formed in the outer face of the disk 17 and arranged on the interior of each tubular member at the forward end thereof is a series of longitudinally disposed ribs 29 of hardened metal, which ribs are substantially triangular in cross section and arranged so that their apices project a slight distance into the chamber of the tubular die. The rear ends of the dies are threaded to receive collars 30 that bear directly against the face of disk 18.

The rear portions of the dies are slightly countersunk or enlarged by being milled out as designated by 31 in order to permit the formed and baked briquettes to readily discharge from the forming dies into the forward ends of the briquette holders that occupy the cooling chamber of the apparatus.

Each tubular die is provided throughout its length with one or more rows of minute perforations 32, the same being provided in order to permit the escape of gases and volatile matter that are driven out of the briquettes while the same are being baked.

Seated in each tubular die and at suitable points throughout its length and preferably in longitudinal alignment with each other and with the ribs 29 are pins or screws 33 that pass through the walls of the tube and the inner ends of said pins or screws are pointed. These pins or screws are for the purpose of keeping open the grooves that are formed in the peripheries of the briquettes by the ribs 29 and which latter, as set forth, are seated in the forward ends of the tubular members 27.

Rigidly fixed in a portion of the frame of the machine above the front trunnion 14 is a sleeve 34 that functions as a primary former or die for the briquettes and seated in the opening through this die or former are longitudinally disposed ribs 35 that are V-shaped in cross section and which ribs are disposed so that they coincide with the ribs 29 carried by the forward end of each tubular member 27.

The sleeve 34 or primary forming die is positioned so that as the rotary member of the apparatus is rotated the tubular members 27 will be successively brought into direct alignment with the sleeve 34 and, as this alignment is accomplished, the ribs 35 will align with the ribs 29. The material from which the briquettes are formed may be fed into the sleeve or primary forming die in any suitable manner, preferably from a hopper (not shown) that is positioned directly in front of said sleeve and arranged for reciprocatory movement through said hopper and through the sleeve 34 is a plunger 36 that is provided in its periphery with longitudinally disposed grooves 37 that accommodate the ribs 35 and 29. The travel of this plunger is such that it passes entirely through sleeve 34 and passes a slight distance into the forward end of each tubular member 27.

Arranged between the disks 18 and 19 and in longitudinal alignment with the dies 27 are holders for the formed briquettes while the same are being cooled, each holder comprising a longitudinally disposed tube 38 that is provided throughout its length with a series of longitudinally disposed slots 39 and coiled about each of these tubes is a resilient wire 40. This construction enables each tubular holder to expand and contract to a slight degree and which action facilitates the travel of the briquettes through the holders while said briquettes are being cooled.

The ends of the holders, which are open, are supported in any suitable manner in the disks 18 and 19. Enclosing the entire series of briquette holders 38 is a shell 41, the ends of which are secured to disks 18 and 19, and formed in this shell adjacent to each formed briquette holder is an aperture such as 42 and arranged at various points around the periphery of said shell are cool air discharge tubes 43 that are adapted to direct jets of cool air through said openings 42 for the purpose of cooling the formed briquette holders.

Interposed between rear bearing 12 and disk 19 is a relatively large disk 44 which is effective in assisting the rear bearing 12 in counteracting or resisting the relatively heavy strains that are transmitted to the rotary member while the plunger is compressing the material into briquettes and forcing the latter into the combined forming and baking dies.

The means for heating the tubular members 27 comprises one or more gas or oil burner tubes such as 45 that extend lengthwise of the rotary member from rear disk 19 through the intermediate disk 18 into each chamber beneath the radial webs that connect the disks 17 and 18 and the rear end of each tube communicates with a common fuel chamber 46, the latter being formed in rear disk 19 and being supplied with gas or oil through an axially disposed duct 47 that is formed in the rear portion of shaft 16 and rear trunnion 14. A gas or oil supply pipe 48 is connected by means of a slip joint 49 to the rear of duct 47.

In producing briquettes in my improved apparatus, the drum or multiple die is intermittently rotated so as to successively bring the tubular die 27 into alignment with the primary die 34, such intermittent rotary motion taking place while plunger 36 is being withdrawn through the primary die.

After a charge of sawdust, wood shavings, or like comminuted vegetable material has been delivered to primary die 34, the plunger 36 moves forwardly therethrough and forces the charge of briquetting material into the receiving end of the aligned tubular die 27 and as said plunger travels to the forward end of its stroke, this material will be packed in homogeneous mass within the receiving end of the tubular die and against the face of the previously formed briquette.

Inasmuch as a relatively high degree of pressure is applied to the briquette material during the forming operations, and as the dies 27 are heated to a considerable degree, a certain percentage of the resin, creosote, and like elements, will be driven from the cells in the particles of wood or vegetable fiber from which the briquettes are formed and these elements will naturally pass to the surface of the briquettes where, when softend by the heat, they will act as a lubricant to facilitate the travel of the briquettes toward the rear ends of the dies 27.

As the briquettes are thus formed, there will be produced in the circumferential surfaces thereof, a plurality of longitudinally disposed grooves, the same being formed by the ribs 35 and 29. These ribs provide channels that permit the ready escape of gaseous and volatile matter that is readily liberated and escapes as the briquettes are subjected to higher temperatures within the machine. In this connection it will be understood that during the briquette forming operations, the oil or gaseous fuel burning at the orifice of the burner tubes 45 provides the necessary heat within that portion of the apparatus that is occupied by the combined forming and baking dies 27.

After a briquette has been thus formed and pressed into the forward end of one of the tubular dies 27 and the plunger 36 has been withdrawn, the multiple dies is rotated so as to bring the next adjacent tubular die into alignment with the forming die 34 and the plunger again moves forward to repeat the briquette forming operation.

The briquettes that occupy the tubular members 27 will be subjected to heat from the jets of the burner tubes 45 and as said briquettes are heated or baked, practically all volatile matter and gases will be expelled from the cells in the material from which the briquettes are formed and these gases escape through the perforations 32 and those gases that do not burn finally pass through the apertures 24 and out through outlet aperture 26.

The release of the gases and volatile matter from the interior of the briquettes during the baking period is accelerated by the provision of the grooves in the surfaces of the briquettes and which grooves are formed by the ribs 29 and 35. These relief grooves are kept open by the points of the screws 33 and which latter are in longitudinal alignment with said ribs 29 and 35.

During the briquette baking operations the resin, creosote, methyl acetate, acetate of lime, and like elements from the wood or material from which the briquettes are formed will, under the continuous pressure, be driven to the surfaces of the briquettes and particularly those surfaces in contact with the tubular dies 27 and as a result, the surfaces of the briquettes will be very thoroughly charred or carbonized, thereby forming a practically solid shell around the peripheries of the briquettes so that the latter may be readily handled without breakage when discharged from the machine, and further, this shell serves as a protection for the briquettes against atmospheric changes when the briquettes are stored.

By regulating the speed at which the multiple die rotates and varying the length of the tubular dies 27, the baking periods of the briquettes may be varied and consequently the degree of carbonization may be very accurately regulated and controlled. In some instances, it may be found desirable to bake the briquettes so that only the surfaces thereof are charred and in other instances, complete charring or carbonization may be accomplished.

The gases that are driven off during the briquette baking period may be taken from the outlet 26 and mixed with the fuel gas that passes to the burner tubes through supply pipe 45, thus materially reducing the cost of operation.

When the briquette material upon and just beneath the surfaces of the grooves that are formed by the ribs 29 and 35 is charred, a series of reinforcing ribs are produced that extend transversely of the peripheral surfaces of the briquettes, thereby materially increasing the strength and stability of the briquettes and consequently minimizing the liability of breakage or fracture while the briquettes are being handled or transported.

After the briquettes pass through the forming and baking dies 27 they discharge into the tubular holders 38 and they gradually move toward the outer ends of said holders and while passing through said holders they will be materially cooled by air drafts that pass through the chamber between the disks 18 and 19. Inasmuch as the tubular holders 38 are slotted and enclosed between coiled wires 40, the air draft delivered to the chamber between the disks 18 and 19 is free to contact with the surfaces of the briquettes, thereby materially decreasing the temperature thereof, and as a result of this cooling action, the briquettes are hardened so that they may be readily handled as soon as they discharge from the ends of the tubular holders.

In the modified construction illustrated in Fig. 7, a tubular die 50 having longitudinally disposed ribs 51 is removably seated in the front disk 17 directly in front of each tubular member 23 and said tubular member 50 being detachably retained in said disk in any suitable manner, preferably by means of a set screw 52. This construction enables the briquette forming dies to be readily removed and repaired or replaced in the event that they become worn or broken in service.

While I have shown and described my improved apparatus as being especially designed for briquetting sawdust, shavings, and like comminuted wood, it will be understood that said apparatus may be employed with equal advantage in briquetting straw, hay, peat, or in fact any similar vegetable matter, and in some instances it may be found advantageous to arrange the multiple die so that it rotates on a vertical axis instead of on a horizontal axis as herein shown and described.

Obviously the multiple die may be heated in any suitable manner, either by fuel gas, hot air, steam, or electricity, and in all instances the fuel heated fluid or electric wires are taken into the rotary member through one of the trunnions thereof, preferably the trunnion at the rear end of the machine.

Thus it will be seen that I have provided a relatively simple apparatus that may be economically employed for producing and baking fuel briquettes from vegetable matter such as sawdust, shavings, straw, hay, or the like.

It will be understood that minor changes in the size, form and construction of the various parts of my improved fuel briquette forming and drying machine may be made and substituted for those herein shown and described without departing from the spirit of my invention, the scope of which is set forth in the appended claims.

I claim as my invention:

1. In a briquette forming and baking machine, an elongated tubular die, longitudinally disposed ribs arranged on the inner surface of said die at its receiving end and pointed members extending through the wall of said die in longitudinal alignment with said ribs.

2. In a briquette forming and baking machine, a rotary member, a series of elongated tubular dies carried thereby, the walls of which dies are perforated, means for successively compressing charges of briquette material and forcing the same into the dies, means for heating the dies to drive off gases and volatile matter from the briquettes within said dies and means associated with said rotary member for confining and recovering said gases and volatile matter.

3. In a briquette forming and baking machine, a member mounted for rotation, a series of tubular dies carried by said member, a relatively fixed briquette forming die with which the receiving ends of the tubular dies are adapted to register as the member is rotated and a grooved plunger adapted to move through said fixed die and to successively enter the ends of the tubular dies.

4. In a briquette forming machine, the combination with a substantially tubular forming die provided with internally arranged longitudinally disposed ribs and a grooved die adapted to enter said ribbed die.

5. In a briquette forming an baking machine, a die-carrying member having an axially disposed portion upon which it rotates and said axially disposed portion being provided with a duct for the admission of a heating element.

6. In a briquette forming and baking machine, a hollow rotary die-carrying member having trunnions, one of which is provided with a duct for the admission of a heating element.

7. In a briquette forming machine, a rotatively mounted member having a heating chamber and a cooling chamber, a series of elongated tubular dies carried by said member and extending through the heating chamber and a series of holders for the formed briquettes extending through said cooling chamber.

8. In a briquette forming machine, a rotary member divided into a heating chamber and a cooling chamber, a series of elongated tubular dies carried by said member and extending through the heating chamber therein and means located in the cooling chamber for supporting briquettes that are formed in said tubular dies.

9. In a briquette forming machine, a rotary member divided into a heating chamber and a cooling chamber, a series of tubular dies carried by said member and extending through the heating chamber therein, means for successively forcing charges of briquette material into said dies and means within said cooling chamber for receiving and holding the formed briquettes after they discharge from the dies and pass through said cooling chamber.

10. In a briquette forming machine, a briquette receiving and holding member comprising a slotted tube and a resilient member surrounding said slotted tube.

11. A briquette forming and baking machine comprising a primary forming die, a plurality of secondary forming and heating dies, means for aligning said secondary forming and heating dies and said holding dies, means rotatably mounting said aligned dies about a common center and equidistant therefrom, a plunger fitting said primary forming die and engaging one of said secondary forming and heating dies in alignment therewith, and means upon removal of said plunger from said secondary forming and heating die for rotating said alined secondary forming and heating dies and said holding dies.

12. A briquette forming and baking machine comprising a primary forming die, a plurality of secondary forming and heating dies, means for aligning said secondary forming and heating dies and said holding dies, means rotatably mounting said aligned dies about a common center and equidistant therefrom, a plunger fitting said primary forming die and engaging one of said secondary forming and heating dies in alignment therewith, and means upon disengagement of said plunger from said secondary forming and heating die for rotating said aligned secondary forming and heating dies and holding dies and means for successively aligning said primary forming dies with said secondary forming and heating dies and said holding dies.

13. A briquette forming and baking machine comprising a primary forming die, a plurality of secondary forming and heating dies, a plurality of holding dies, said secondary forming and heating dies and said holding dies being rotatable about a common axis and adapted to register with each other, said heating dies providing hollow integral perforated members, said holding dies providing hollow expansible members, a plunger fitting said primary forming die and engaging one of said secondary forming and heating dies, means upon disengagement of said plunger from said secondary forming and heating dies for rotating said secondary forming and heating dies and holding dies in their aligned position and means for successively aligning said primary forming dies with said secondary forming and heating dies and said holding dies.

14. A briquette forming and baking machine comprising a primary forming die, ribs on said die, a plurality of secondary forming and heating dies, ribs on said last named dies, a plurality of resilient holding dies, means aligning said secondary forming and heating dies and said holding dies, means rotatably mounting said aligned dies about a common center and equidistant therefrom, a plunger fitting said primary forming die and engaging one of said secondary forming and heating dies in alignment therewith, grooves in said plunger, the ribs on said primary forming die and said secondary forming and heating die coinciding with the grooves in said plunger, means for cooling said resilient holding dies, means upon disengagement of said plunger from said secondary forming and heating die for rotating said secondary forming and heating dies and holding dies in their aligned position and means for successively aligning said primary forming dies with said secondary forming and heating dies and said holding dies.

In testimony whereof I affix my signature.

WILLIAM C. CARPENTER.